United States Patent
Nazari et al.

(10) Patent No.: US 10,452,274 B2
(45) Date of Patent: Oct. 22, 2019

(54) DETERMINING LENGTHS OF ACKNOWLEDGMENT DELAYS FOR I/O COMMANDS

(71) Applicant: HEWLETT PACKARD ENTERPRISE DEVELOPMENT LP, Houston, TX (US)

(72) Inventors: Siamak Nazari, Fremont, CA (US); Srinivasa D Murthy, Fremont, CA (US); Jin Wang, Fremont, CA (US); Ming Ma, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/305,156

(22) PCT Filed: Apr. 30, 2014

(86) PCT No.: PCT/US2014/036079
§ 371 (c)(1),
(2) Date: Oct. 19, 2016

(87) PCT Pub. No.: WO2015/167505
PCT Pub. Date: Nov. 5, 2015

(65) Prior Publication Data
US 2017/0038972 A1 Feb. 9, 2017

(51) Int. Cl.
*G06F 3/00* (2006.01)
*G06F 3/06* (2006.01)
(Continued)

(52) U.S. Cl.
CPC .............. *G06F 3/061* (2013.01); *G06F 3/068* (2013.01); *G06F 3/0659* (2013.01); *G06F 11/34* (2013.01);
(Continued)

(58) Field of Classification Search
CPC .. G06F 13/385; G06F 13/387; G06F 13/1689; G06F 13/382; G06F 13/4009;
(Continued)

(56) References Cited

U.S. PATENT DOCUMENTS 7,739,470 B1 6/2010 Norgren
8,352,435 B1 1/2013 Ruef et al.
(Continued)

OTHER PUBLICATIONS

Vmware, "ESX/ESXi hosts might experience read or write performance issues with certain storage arrays (1002598)," (Web Page), Dec. 3, 2013, 8 pages, available at http://kb.vmware.com/selfservice/microsites/search.do?language=en_US&cmd=displayKC&externalId=1002598.
(Continued)

*Primary Examiner* — Tim T Vo
*Assistant Examiner* — Kim T Huynh
(74) *Attorney, Agent, or Firm* — Hewlett Packard Enterprise Patent Department

(57) ABSTRACT

Example implementations relate to determining lengths of acknowledgment delays for input/output (I/O) commands. In example implementations, a length of an acknowledgment delay for a respective I/O command may be based on cache availability, and activity level of a drive at which the respective I/O command is directed, after the respective I/O command has been executed. Acknowledgments for respective I/O commands may be transmitted after respective periods of time equal to respective lengths of acknowledgment delays have elapsed.

21 Claims, 6 Drawing Sheets

(51) Int. Cl.
  *G06F 12/0875* (2016.01)
  *G06F 12/0866* (2016.01)
  *G06F 11/34* (2006.01)
  *G06F 13/38* (2006.01)

(52) U.S. Cl.
  CPC ...... *G06F 12/0866* (2013.01); *G06F 12/0875* (2013.01); *G06F 13/38* (2013.01); *G06F 2212/1024* (2013.01); *G06F 2212/452* (2013.01); *G06F 2212/466* (2013.01)

(58) Field of Classification Search
  CPC .. G06F 13/4013; G06F 3/0232; G06F 3/0234; G06F 3/0237; G06F 3/0236
  USPC .............................................. 710/61–68, 100
  See application file for complete search history.

(56) References Cited

U.S. PATENT DOCUMENTS

| | | | | |
|---|---|---|---|---|
| 8,429,348 | B2* | 4/2013 | Factor | G06F 12/0866 711/118 |
| 8,589,603 | B2 | 11/2013 | Craddock et al. | |
| 2003/0084252 | A1 | 5/2003 | Talagala | |
| 2006/0112155 | A1 | 5/2006 | Earl et al. | |
| 2009/0006606 | A1 | 1/2009 | Lubbers et al. | |
| 2009/0157974 | A1* | 6/2009 | Lasser | G06F 12/0884 711/135 |
| 2012/0047318 | A1 | 2/2012 | Yoon et al. | |
| 2012/0331209 | A1 | 12/2012 | Kwon | |
| 2013/0042066 | A1 | 2/2013 | Price | |
| 2013/0311643 | A1 | 11/2013 | Kulkarni | |
| 2014/0351626 | A1 | 11/2014 | Best et al. | |

OTHER PUBLICATIONS

International Search Report & Written Opinion received in PCT Application No. PCT/US2014/036079, dated Feb. 11, 2016, 9 pages.
Allman et al., "TCP Congestion Control," Sep. 2009, RFC 5681. Network Working Group <https://tools.ietf.org/pdf/rfc5681.pdf> (18 pages).
Hewlett-Packard Development Company, L.P., "HP 3PAR OS 3.1.2: Release Notes," Oct. 2013, Editions. 2 (59 pages).
Stevens, W., "TCP Slow Start, Congestion Avoidance, Fast Retransmit, and Fast Recovery Algorithms," RFC 2001, Network Working Group, <https://tools.ieft.org/pdf/rfc2001.pdf> (6 pages).
Vashisht, Justin, "Diagnosing some common 3PAR Performance Issue," Dec. 11, 2013, <http://3cvguy.com/some-3par-commands-to-help-diagnose-performance-issues/> (6 pages).

* cited by examiner

DETERMINING LENGTHS OF ACKNOWLEDGMENT DELAYS FOR I/O COMMANDS

BACKGROUND

Read and write commands may be directed at various storage drives in a storage system. Read and write commands may be stored in a cache before they are executed. An acknowledgment may be sent after a read or write command is executed.

BRIEF DESCRIPTION OF THE DRAWINGS

The following detailed description references the drawings, wherein.

DETAILED DESCRIPTION

A storage system may include a plurality of storage drives. Input/Output (I/O) commands directed at storage drives may originate from various hosts. As used herein, the term "I/O command" should be understood to refer to a command associated with data to be transferred to or from a drive. For example, an I/O command may be a command to read data from a drive, or a command to write data to a drive. After an I/O command is executed, an acknowledgment may be sent to the appropriate host (e.g., the host from which the I/O command originated).

I/O commands directed at storage drives in a storage system may be stored in a cache before being executed. If a drive in the storage system is running slowly (e.g., because of mechanical or positioning issues), I/O commands may accumulate in the cache, and the cache may overflow. To prevent cache overflow, acknowledgements to hosts may be delayed to prevent hosts from sending more I/O commands, or to slow down the rate at which hosts send I/O commands. A delay in the transmission of an acknowledgment to a host may be referred to herein as an "acknowledgment delay". Rather than delaying acknowledgments for all I/O commands when a drive runs slowly, the present disclosure provides for delaying acknowledgments for I/O commands directed at a slow drive, while acknowledgments for I/O commands directed at other drives may be sent without delay.

Figure 1:
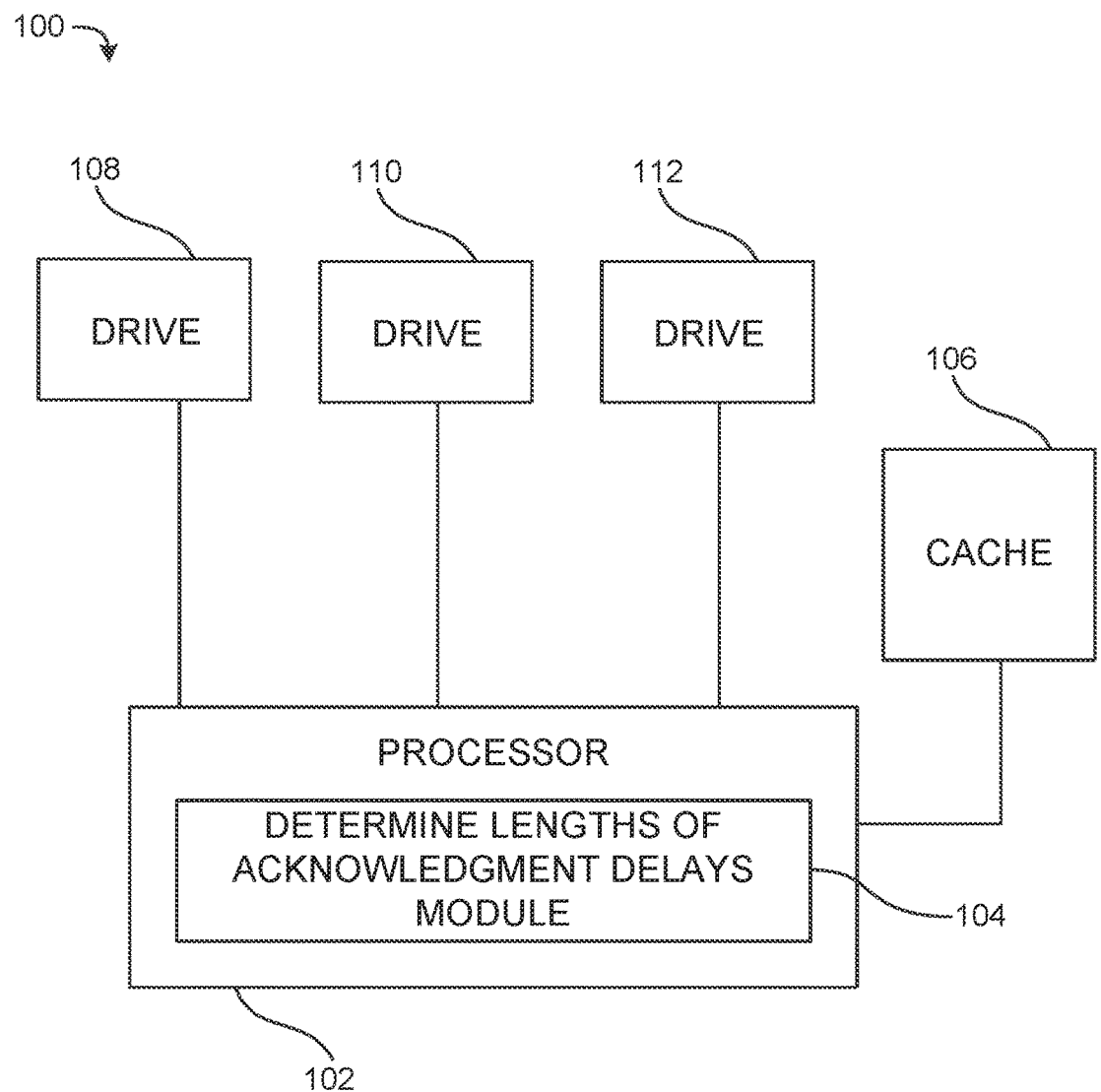
FIG. 1 is a block diagram of an example system for determining lengths of acknowledgment delays for input/output (I/O) commands.

Referring now to the drawings, FIG. 1 is a block diagram of an example system 100 for determining lengths of acknowledgment delays for I/O commands. In FIG. 1, system 100 includes processor 102, which may be communicatively coupled to cache 106 and to drives 108, 110, and 112. As used herein, the terms "include", "have", and "comprise" are interchangeable and should be understood to have the same meaning.

Cache 106 may store I/O commands directed at drives 108, 110, and 112. A drive at which an I/O command is directed (e.g., a drive from which data is to be read or to which data is to be written) may be referred to as a "target drive". In some implementations, cache 106 may include a random-access memory (RAM) or other suitable volatile memory. Each of drives 108, 110, and 112 may include a hard disk drive (HDD), solid-state drive (SSD), tape drive, or any other suitable data storage device. Although three drives are shown in FIG. 1, it should be understood that system 100 may include additional drives or fewer drives.

As illustrated in FIG. 1, processor 102 may be communicatively coupled to cache 106 and drives 108, 110, and 112. Processor 102 may identify a target drive for each of the I/O commands stored in cache 106, and may execute I/O commands on the appropriate drives. Processor 102 may include module 104. A module may include a set of instructions encoded on a machine-readable storage medium and executable by processor 102. In addition or as an alternative, a module may include a hardware device comprising electronic circuitry for implementing the functionality described below.

Module 104 may determine lengths of acknowledgment delays for I/O commands. A length of an acknowledgment delay for a respective I/O command may be based on cache availability, and activity level of a drive at which the respective I/O command is directed, after the respective I/O command has been executed. For example, for an I/O command directed at drive 108, the length of an acknowledgment delay for the I/O command may be based on cache availability of cache 106, and activity level of drive 108, after the I/O command has been executed on drive 108. As used herein, the term "cache availability" should be understood to refer to how much free memory space exists in a cache. Cache availability may be expressed as a percentage. For example, if I/O commands stored in a cache are utilizing one-fourth of the cache's memory space (e.g., the cache is one-fourth full), the cache may have 75% cache availability. Acknowledgment delays may be shorter (or zero) when cache availability is higher, and longer when cache availability is lower to prevent cache overflow. Acknowledgments for I/O commands for which acknowledgment delays of non-zero length are determined may be held in an acknowledgment queue.

The term "activity level", as used herein with respect to a drive, should be understood to refer to a measure of how much of its resources a drive expends executing I/O commands. For example, a drive that is a target drive for many I/O commands in a short period of time may have a high activity level during the period of time, and another drive on which very few I/O commands are executed during the same period of time may have a low activity level during the period of time. Activity level of a drive may be expressed as an idle percentage that indicates how much time the drive could spend executing I/O commands relative to how much time the drive actually spends executing I/O commands. For example, a drive that has spent one-tenth of a period of time executing I/O commands and has been idle (i.e., not executing I/O commands) for the rest of the period of time may have an idle percentage of 90%. Acknowledgment delays for I/O commands directed at a particular drive may be shorter (or zero) when activity level of the drive is lower (e.g., when idle percentage of the drive is higher), and longer when activity level of the drive is higher (e.g., when idle percentage of the drive is lower) to prevent too much accumulation in the cache of I/O commands directed at the drive.

Figure 2:
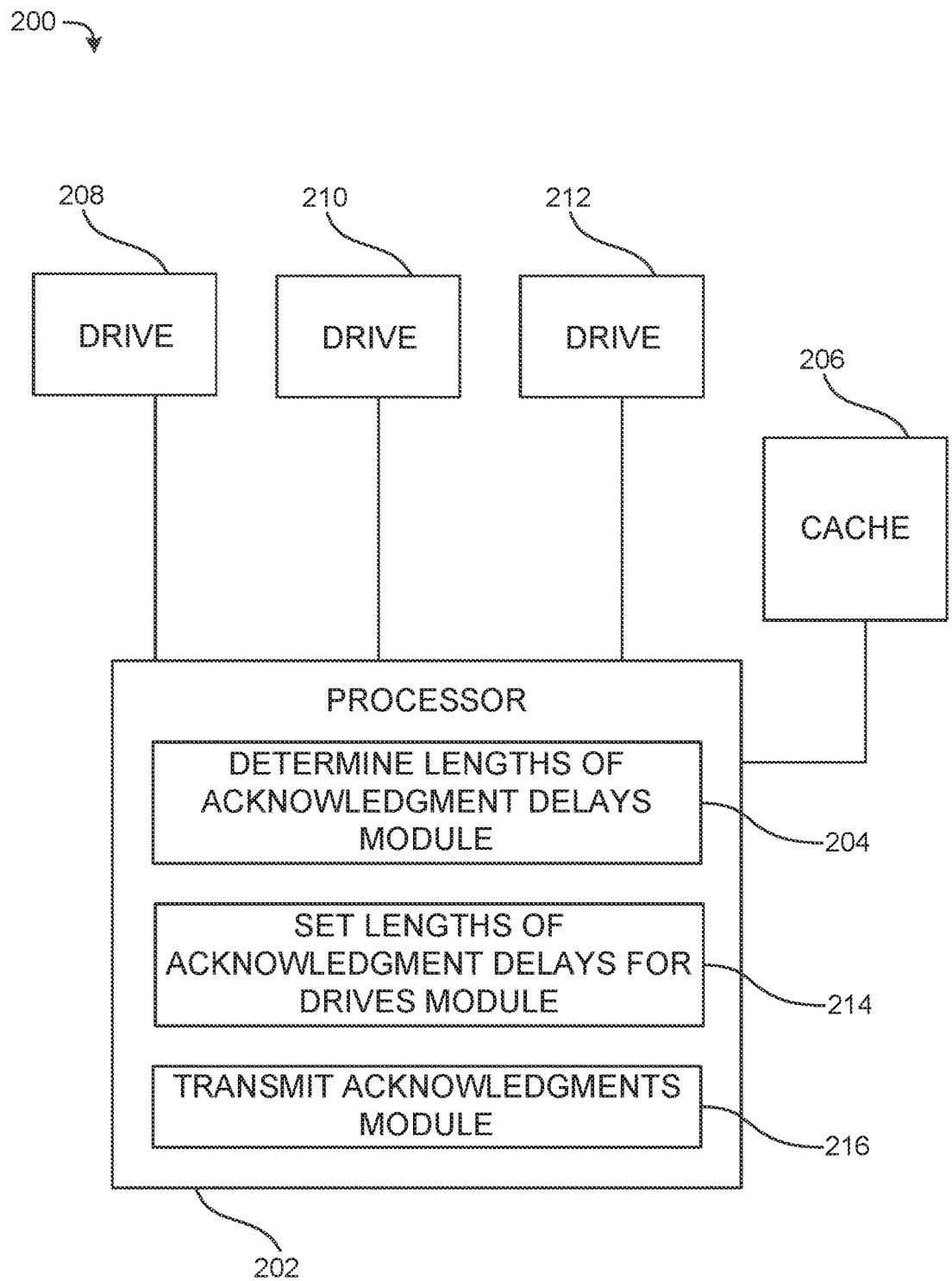
FIG. 2 is a block diagram of an example system for setting lengths of acknowledgment delays.

FIG. 2 is a block diagram of an example system 200 for setting lengths of acknowledgment delays. In FIG. 2, system 200 includes processor 202, which may be communicatively coupled to cache 206 and to drives 208, 210, and 212. Cache 206 may be analogous to (e.g., have functions and/or components similar to) cache 106 of FIG. 1, and drives 208, 210, and 212 may be analogous to drives 108, 110, and 112, respectively, of FIG. 1. Although three drives are shown in FIG. 2, it should be understood that system 200 may include additional drives or fewer drives.

As illustrated in FIG. 2, processor 202 may be communicatively coupled to cache 206 and drives 208, 210, and 212. Processor 202 may identify a target drive for each of the I/O commands stored in cache 206, and may execute I/O commands on the appropriate drives. Processor 202 may include modules 204, 214, and 216. A module may include a set of instructions encoded on a machine-readable storage medium and executable by processor 202. In addition or as an alternative, a module may include a hardware device comprising electronic circuitry for implementing the functionality described below.

Module 204 of processor 202 may be analogous to module 104 of processor 102. Module 214 may set lengths of acknowledgment delays for I/O commands directed at various drives. For a given cache availability, acknowledgment delays for I/O commands directed at a drive having a lower idle percentage may be longer than acknowledgment delays for I/O commands directed at a drive having a higher idle percentage. For example, module 214 may set a length of acknowledgment delays, for I/O commands that are directed at drive 208, at a first non-zero value if cache availability (e.g., of cache 206) is below a first cache availability threshold, and idle percentage of drive 208 is below a first idle percentage threshold, after a first I/O command directed at drive 208 has been executed. Module 214 may set a length of acknowledgment delays, for I/O commands that are directed at drive 210, at zero if cache availability is below the first cache availability threshold, and idle percentage of drive 210 is above the first idle percentage threshold, after a second I/O command directed at drive 210 has been executed.

Module 214 may increment or decrement lengths of acknowledgment delays as cache availability and idle percentage cross various thresholds. In some implementations, lengths of acknowledgment delays may be set to zero if cache availability is above an initial threshold, and may be incremented each time cache availability drops below additional thresholds that are less than the initial threshold (e.g., the initial threshold may be 20%, and additional thresholds for cache availability may be 15%, 10%, and 5%). If cache availability is below the initial threshold, lengths of acknowledgment delays for I/O commands directed at a particular drive may be incremented each time the idle percentage of the drive drops below various idle percentage thresholds. Lengths of acknowledgment delays may be decremented as cache availability or idle percentage rises above respective thresholds.

For example, module 214 may increment the length of acknowledgment delays, for I/O commands that are directed at drive 208, if cache availability (e.g., of cache 206) is below a second cache availability threshold that is lower than the first cache availability threshold, or if idle percentage of drive 208 is below a second idle percentage threshold that is lower than the first idle percentage threshold, after a third I/O command directed at drive 208 has been executed. Module 214 may increment the length of acknowledgment delays, for I/O commands that are directed at drive 208, each time cache availability drops below additional cache availability thresholds that are lower than the second cache availability threshold, or each time idle percentage of drive 208 drops below additional idle percentage thresholds that are lower than the second idle percentage threshold, after subsequent I/O commands directed at drive 208 are executed. Module 214 may decrement the length of acknowledgment delays, for I/O commands that are directed at drive 208, each time cache availability rises above one of the additional cache availability thresholds, or each time idle percentage of drive 208 rises above one of the additional idle percentage thresholds, after subsequent I/O commands directed at drive 208 are executed.

In some implementations, the lengths of acknowledgment delays may be capped based on drive type. Certain types of drives may naturally have longer latency times for accessing data than other types of drives. For example, HDDs may naturally have longer latency times for accessing data than SSDs. The ceiling for lengths of acknowledgment delays, for I/O commands directed at drives with naturally longer latency times, may be higher than the ceiling for lengths of acknowledgment delays for I/O commands directed at drives with naturally shorter latency times.

For example, lengths of acknowledgment delays may be incremented by a certain amount (e.g., 2 milliseconds) each time cache availability drops below the thresholds of 20%, 15%, 10%, and 5%. Module 214 may cap, based on drive type of drive 208, the length of acknowledgment delays for I/O commands that are directed at drive 208. Drive 208 may be an SSD, and module 214 may cap the length of acknowledgment delays for I/O commands having an SSD as a target drive at 6 milliseconds. Module 214 may cap, based on drive type of drive 210, the length of acknowledgment delays for I/O commands that are directed at drive 210. Drive 210 may be an HDD, and module 214 may cap the length of acknowledgment delays for I/O commands having an HDD as a target drive at 8 milliseconds. Thus, when cache availability is at 9% (i.e., when cache availability has dropped below three cache availability thresholds), the length of acknowledgment delays for I/O commands directed at drive 208 may be 6 milliseconds, and the length of acknowledgment delays for I/O commands directed at drive 210 may also be 6 milliseconds. If cache availability drops to 4% (i.e., when cache availability has dropped below a fourth cache availability threshold), the length of acknowledgment delays for I/O commands directed at drive 210 may be incremented to 8 milliseconds, but the length of acknowledgment delays for I/O commands directed at drive 208 may remain at 6 milliseconds, which is the ceiling for I/O commands having an SSD as a target drive.

As mentioned above, acknowledgments for I/O commands for which acknowledgment delays of non-zero length are determined may be held in an acknowledgment queue. Module 216 may transmit each of the acknowledgments after respective lengths of time equal to respective lengths of acknowledgment delays have elapsed. For example, a first acknowledgment in the acknowledgment queue may have a delay of 4 milliseconds, and a second acknowledgment in the acknowledgment queue may have a delay of 6 milliseconds. Module 216 may transmit the first acknowledgment to the appropriate host after the first acknowledgment has been in the acknowledgment queue for 4 milliseconds, and may transmit the second acknowledgment to the appropriate host after the second acknowledgment has been in the acknowledgment queue for 6 milliseconds.

Figure 3:
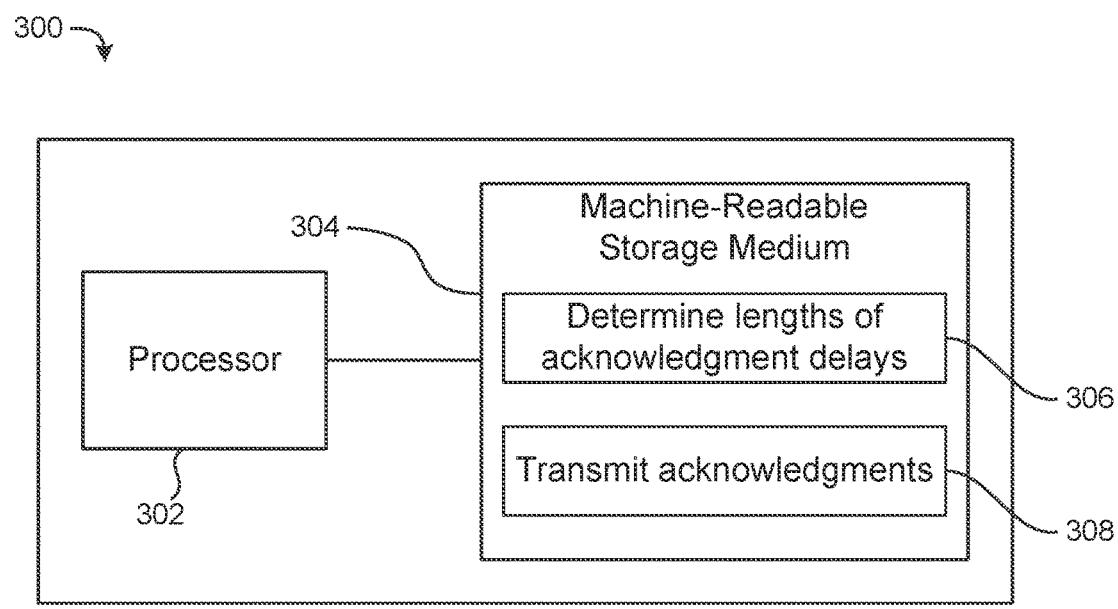
FIG. 3 is a block diagram of an example device that includes a machine-readable storage medium encoded with instructions to enable determining lengths of acknowledgment delays for I/O commands.

FIG. 3 is a block diagram of an example device 300 that includes a machine-readable storage medium encoded with instructions to enable determining lengths of acknowledgment delays for I/O commands. In some implementations, device 300 may operate as and/or be part of a server. In FIG. 3, device 300 includes processor 302 and machine-readable storage medium 304.

Processor 302 may include a central processing unit (CPU), microprocessor (e.g., semiconductor-based microprocessor), and/or other hardware device suitable for retrieval and/or execution of instructions stored in machine-readable storage medium 304. Processor 302 may be an implementation of processor 102 of FIG. 1 or processor 202 of FIG. 2. Processor 302 may fetch, decode, and/or execute instructions 306 and 308 to enable determining lengths of acknowledgment delays for I/O commands, as described below. As an alternative or in addition to retrieving and/or executing instructions, processor 302 may include an electronic circuit comprising a number of electronic components for performing the functionality of instructions 306 and/or 308.

Machine-readable storage medium 304 may be any suitable electronic, magnetic, optical, or other physical storage device that contains or stores executable instructions. Thus, machine-readable storage medium 304 may include, for example, a RAM, an Electrically Erasable Programmable Read-Only Memory (EEPROM), a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306 and 308.

Instructions 306 may determine lengths of acknowledgment delays for I/O commands. A length of an acknowledgment delay for a respective I/O command may be based on cache availability, and activity level of a drive at which the respective I/O command is directed, after the respective I/O command has been executed. In some implementations, an activity level of a drive may be expressed as an idle percentage. Acknowledgment delays may be shorter (or zero) when cache availability is higher or activity level is lower, and longer when cache availability is lower or activity level is higher to prevent cache overflow, as discussed above with respect to FIG. 1. In some implementations, acknowledgments for I/O commands for which acknowledgment delays of non-zero length are determined may be held in an acknowledgment queue.

Instructions 308 may transmit acknowledgments for respective I/O commands after respective periods of time equal to respective lengths of acknowledgment delays have elapsed. For example, a first acknowledgment in the acknowledgment queue may have a delay of 4 milliseconds, and a second acknowledgment in the acknowledgment queue may have a delay of 6 milliseconds. Instructions 308 may transmit the first acknowledgment to the appropriate host after the first acknowledgment has been in the acknowledgment queue for 4 milliseconds, and may transmit the second acknowledgment to the appropriate host after the second acknowledgment has been in the acknowledgment queue for 6 milliseconds.

Figure 4:
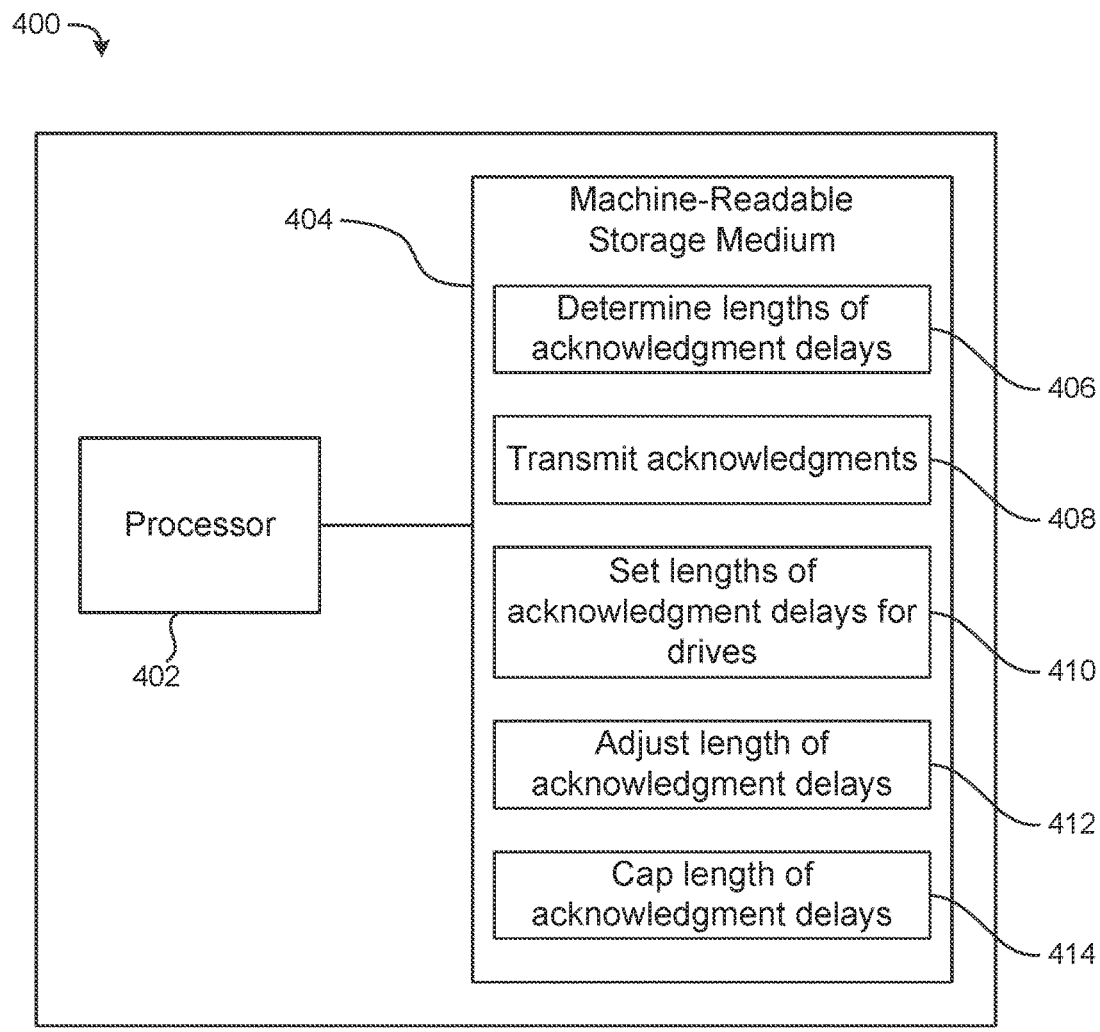
FIG. 4 is a block diagram of an example device that includes a machine-readable storage medium encoded with instructions to enable varying lengths of acknowledgment delays.

FIG. 4 is a block diagram of an example device 400 that includes a machine-readable storage medium encoded with instructions to enable varying lengths of acknowledgment delays. In some implementations, device 400 may operate as and/or be part of a server. In FIG. 4, device 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may be an implementation of processor 102 of FIG. 1 or processor 202 of FIG. 2. Processor 402 may fetch, decode, and/or execute instructions 406, 408, 410, 412, and 414 to enable varying lengths of acknowledgment delays, as described below. As an alternative or in addition to retrieving and/or executing instructions, processor 402 may include an electronic circuit comprising a number of electronic components for performing the functionality of instructions 406, 408, 410, 412, and/or 414.

As with machine-readable storage medium 304 of FIG. 3, machine-readable storage medium 404 may be any suitable physical storage device that stores executable instructions. Instructions 406 and 408 on machine-readable storage medium 404 may be analogous to instructions 306 and 308 on machine-readable storage medium 304. Instructions 410 may set lengths of acknowledgment delays for I/O commands that are directed at various drives. For a given cache availability, acknowledgment delays for I/O commands directed at a drive having a lower idle percentage may be longer than acknowledgment delays for I/O commands directed at a drive having a higher idle percentage. For example, instructions 410 may set a length of acknowledgment delays, for I/O commands that are directed at a first drive, at a first non-zero value if cache availability is below a first cache availability threshold, and idle percentage of the first drive is below a first idle percentage threshold, after a first I/O command directed at the first drive has been executed. Instructions 410 may set a length of acknowledgment delays, for I/O commands that are directed at a second drive, at zero if cache availability is below the first cache availability threshold, and idle percentage of the second drive is above the first idle percentage threshold, after a second I/O command directed at the second drive has been executed.

Instructions 412 may adjust a length of acknowledgment delays for I/O commands that are directed at various drives. In some implementations, lengths of acknowledgment delays may be set to zero if cache availability is above an initial threshold, and may be incremented each time cache availability drops below additional thresholds that are less than the initial threshold (e.g., the initial threshold may be 20%, and additional thresholds for cache availability may be 15%, 10%, and 5%). If cache availability is below the initial threshold, lengths of acknowledgment delays for I/O commands directed at a particular drive may be incremented each time the idle percentage of the drive drops below various idle percentage thresholds. Lengths of acknowledgment delays may be decremented as cache availability or idle percentage rises above respective thresholds.

For example, instructions 412 may increment the length of acknowledgment delays, for I/O commands that are directed at the first drive, each time cache availability drops below additional cache availability thresholds that are lower than the first cache availability threshold, or each time idle percentage of the first drive drops below additional idle percentage thresholds that are lower than the first idle percentage threshold, after subsequent I/O commands directed at the first drive are executed. Instructions 412 may decrement the length of acknowledgment delays, for I/O commands that are directed at the first drive, each time cache availability rises above one of the additional cache availability thresholds, or each time idle percentage of the first drive rises above one of the additional idle percentage thresholds, after subsequent I/O commands directed at the first drive are executed.

Instructions 414 may cap a length of acknowledgment delays for I/O commands that are directed at various drives. Certain types of drives may naturally have longer latency times for accessing data than other types of drives, as discussed above with respect to FIG. 2. The ceiling for lengths of acknowledgment delays, for I/O commands directed at drives with naturally longer latency times, may be higher than the ceiling for lengths of acknowledgment delays for I/O commands directed at drives with naturally shorter latency times.

For example, lengths of acknowledgment delays may be incremented by a certain amount (e.g., 2 milliseconds) each time cache availability drops below the thresholds of 20%, 15%, 10%, and 5%. Instructions 414 may cap, based on drive type of the first drive, the length of acknowledgment delays for I/O commands that are directed at the first drive. The first drive may be an SSD, and instructions 414 may cap the length of acknowledgment delays for I/O commands having an SSD as a target drive at 6 milliseconds. Instructions 414 may cap, based on drive type of the second drive, the length of acknowledgment delays for I/O commands that are directed at the second drive. The second drive may be an HDD, and instructions 414 may cap the length of acknowledgment delays for I/O commands having an HDD as a target drive at 8 milliseconds. Thus, when cache availability is at 9% (i.e., when cache availability has dropped below three cache availability thresholds), the length of acknowledgment delays for I/O commands directed at the first drive may be 6 milliseconds, and the length of acknowledgment delays for I/O commands directed at the second drive may also be 6 milliseconds. If cache availability drops to 4% (i.e., when cache availability has dropped below a fourth cache availability threshold), the length of acknowledgment delays for I/O commands directed at the second drive may be incremented to 8 milliseconds, but the length of acknowledgment delays for I/O commands directed at the first drive may remain at 6 milliseconds, which is the ceiling for I/O commands having an SSD as a target drive.

Figure 5:
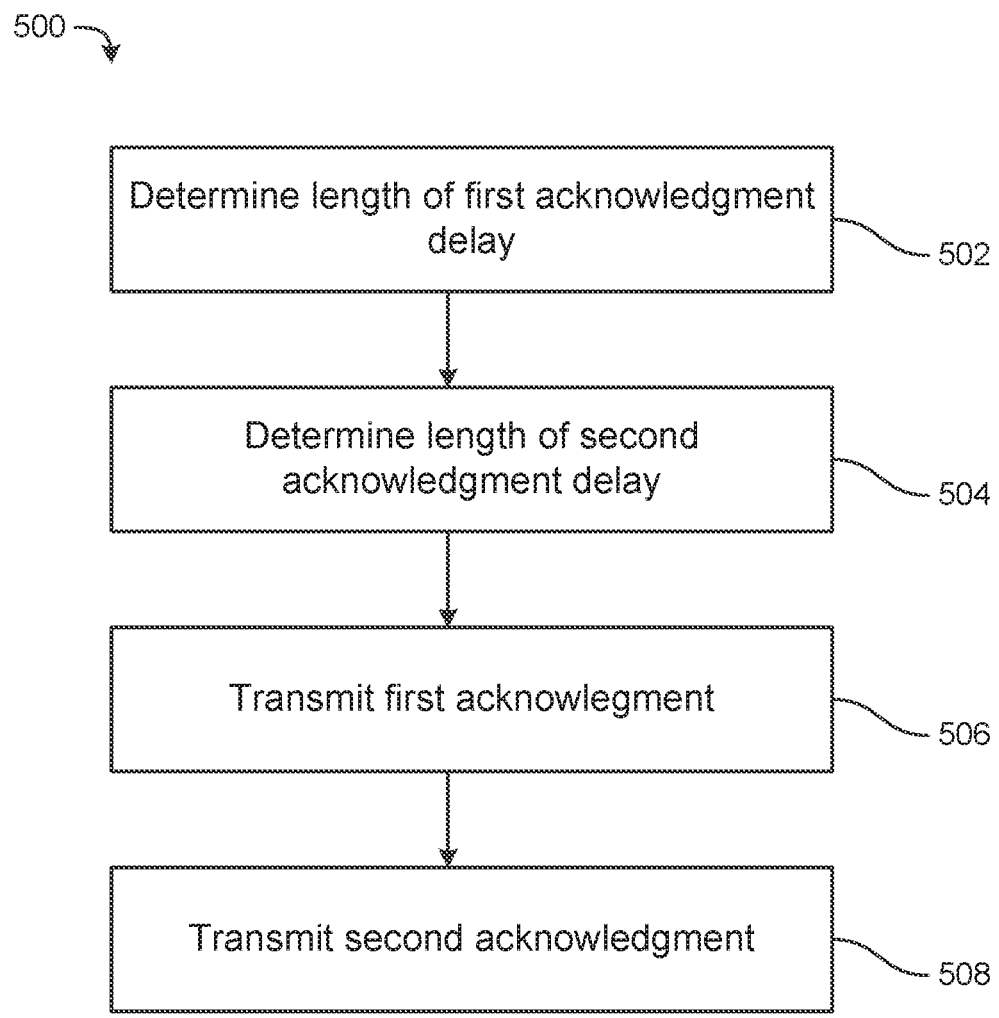
FIG. 5 is a flowchart of an example method for determining lengths of acknowledgment delays for I/O commands.
Figure 6:
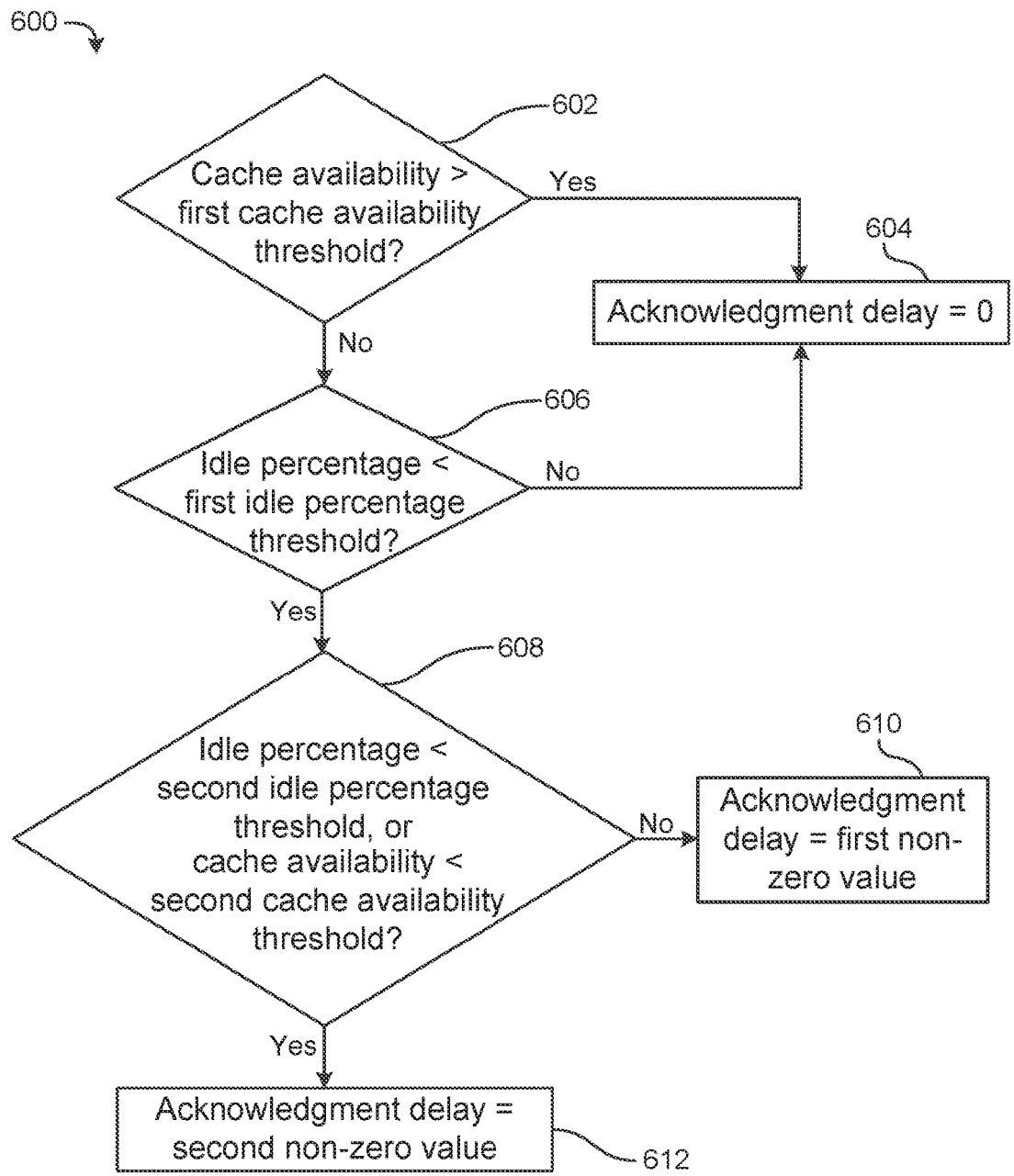
FIG. 6 is a flowchart of an example method for setting lengths of acknowledgment delays.

Methods related to using acknowledgment delays for cache management are discussed with respect to FIGS. 5-6. FIG. 5 is a flowchart of an example method 500 for determining lengths of acknowledgment delays for I/O commands. Although execution of method 500 is described below with reference to processor 302 of FIG. 3, it should be understood that execution of method 500 may be performed by other suitable devices, such as processor 402 of FIG. 4. Method 500 may be implemented in the form of executable instructions stored on a machine-readable storage medium and/or in the form of electronic circuitry.

Method 500 may start in block 502, where processor 302 may determine, based on cache availability and activity level of a first drive after a first I/O command directed at the first drive has been executed, a length of a first acknowledgment delay for the first I/O command. For example, the length of the first acknowledgment delay may be determined to be zero if cache availability is above a first cache availability threshold after the first command has been executed. The length of the first acknowledgment delay may be determined to be a first non-zero value if cache availability is below the first cache availability threshold, and idle percentage of the first drive is below a first idle percentage threshold, after the first I/O command has been executed. The length of the first acknowledgment delay may be determined to be a second non-zero value greater than the first non-zero value if cache availability is below a second cache availability threshold that is lower than the first cache availability threshold, or if idle percentage of the first drive is below a second idle percentage threshold that is lower than the first idle percentage threshold, after the first I/O command has been executed.

In block 504, processor 302 may determine, based on cache availability and activity level of a second drive after a second I/O command directed at the second drive has been executed, a length of a second acknowledgment delay for the second I/O command. For example, the length of the second acknowledgment delay may be determined to be zero if cache availability is above the first cache availability threshold after the second command has been executed. The length of the second acknowledgment delay may be determined to be zero if cache availability is below the first cache availability threshold, and idle percentage of the second drive is above the first idle percentage threshold, after the second I/O command has been executed. Although block 504 is shown below block 502 in FIG. 5, it should be understood that the elements of block 504 may be performed before or in parallel with the elements of block 502.

In block 506, processor 302 may transmit a first acknowledgment for the first I/O command after a first period of time equal to the length of the first acknowledgment delay has elapsed. In some implementations, the first acknowledgment may be held in an acknowledgment queue during the first period of time. For example, processor 302 may transmit the first acknowledgment to the appropriate host after the first acknowledgment has been in the acknowledgment queue for a period of time equal to the length of the first acknowledgment delay. Although block 506 is shown below block 504 in FIG. 5, it should be understood that the elements of block 506 may be performed before or in parallel with the elements of block 504.

In block 508, processor 302 may transmit a second acknowledgment for the second I/O command after a second period of time equal to the length of the second acknowledgment delay has elapsed. In some implementations, the second acknowledgment may be held in the acknowledgment queue during the second period of time. For example, processor 302 may transmit the second acknowledgment to the appropriate host after the second acknowledgment has been in the acknowledgment queue for a period of time equal to the length of the second acknowledgment delay. Although block 508 is shown below block 506 in FIG. 5, it should be understood that the elements of block 508 may be performed before or in parallel with the elements of block 506. For example, if the length of the second acknowledgment delay is shorter than the length of the first acknowledgment delay, the second acknowledgment may be transmitted before the first acknowledgment.

FIG. 6 is a flowchart of an example method 600 for setting lengths of acknowledgment delays. Although execution of method 600 is described below with reference to processor 302 of FIG. 3, it should be understood that execution of method 600 may be performed by other suitable devices, such as processor 402 of FIG. 4. Some blocks of method 600 may be performed in parallel with and/or after method 500. Method 600 may be implemented in the form of executable instructions stored on a machine-readable storage medium and/or in the form of electronic circuitry.

Method 600 may start in block 602, where processor 302 may determine whether cache availability is above a first cache availability threshold after an I/O command has been executed. In some implementations, cache availability may be expressed as a percentage, as discussed above with respect to FIG. 1. If processor 302 determines that cache availability is above a first cache availability threshold after the I/O command has been executed, method 600 may proceed to block 604, in which the length of the acknowledgment delay for the I/O command may be determined to be zero.

If, in block 602, processor 302 determines that cache availability is not above a first cache availability threshold after the I/O command has been executed, method 600 may proceed to block 606, in which processor 302 may determine whether an idle percentage of the drive, at which the I/O command is directed, is below a first idle percentage threshold after the I/O command has been executed. If processor 302 determines that the idle percentage of the drive is not below the first idle percentage threshold, method 600 may proceed to block 604, in which the length of the acknowledgment delay for the I/O command may be determined to be zero.

If, in block 606, processor 302 determines that the idle percentage of the drive is below the first idle percentage threshold, method 600 may proceed to block 608. In block 608, processor 302 may determine whether the idle percentage of the drive, at which the I/O command is directed, is below a second idle percentage threshold after the I/O command has been executed, and whether cache availability is below a second cache availability threshold after the I/O command has been executed. If processor 302 determines that the idle percentage is not below the second idle percentage threshold, and that cache availability is not below the second cache availability threshold, method 600 may proceed to block 610, in which the length of the acknowledgment delay for the I/O command may be determined to be a first non-zero value. If, in block 608, processor 302 determines that the idle percentage is below the second idle percentage threshold, or that cache availability is below the second cache availability threshold, method 600 may proceed to block 612, in which the length of the acknowledgment delay for the I/O command may be determined to be a second non-zero value.

The foregoing disclosure describes determining lengths of acknowledgment delays for I/O commands. Example implementations described herein enable delaying acknowledgments for I/O commands directed at a slow drive in a storage system, and sending acknowledgments, for I/O commands directed at other drives, without delay.

We claim:

1. A system comprising:
   a plurality of drives;
   a cache to store I/O commands directed at the plurality of drives; and
   a processor communicatively coupled to the plurality of drives and to the cache, wherein the processor is to:
      determine whether a cache availability of the cache is greater than a cache availability threshold;
      in response to determining that the cache availability of the cache is greater than the cache availability threshold, set, for a first I/O command directed at a first drive of the plurality of drives, a length of an acknowledgment delay at zero;
      in response to determining that the cache availability of the cache is not greater than the cache availability threshold:
         determine an activity level of the first drive, and set, for the first I/O command directed at the first drive, the length of the acknowledgment delay based on the determined activity level of the first drive; and
      transmit an acknowledgment for the first I/O command after a delay based on the length of the acknowledgment delay.

2. The system of claim 1, wherein the cache availability threshold is a first cache availability threshold, and wherein the processor is to:
   set the length of the acknowledgment delay, for the first I/O command that is directed at the first drive, at a first non-zero value in response to the cache availability being below the first cache availability threshold, and an idle percentage of the first drive being below a first idle percentage threshold; and
   set a length of an acknowledgment delay, for a second I/O command that is directed at a second drive of the plurality of drives, at zero in response to the cache availability being below the first cache availability threshold, and an idle percentage of the second drive being above the first idle percentage threshold.

3. The system of claim 2, wherein the processor is to:
   increment a length of an acknowledgment delay, for an I/O command directed at the first drive, in response to the cache availability being below a second cache availability threshold that is lower than the first cache availability threshold, or in response to the idle percentage of the first drive being below a second idle percentage threshold that is lower than the first idle percentage threshold.

4. The system of claim 3, wherein the processor is further to:
   increment a length of an acknowledgment delay, for an I/O command directed at the first drive, in response to the cache availability dropping below an additional cache availability threshold lower than the second cache availability threshold, or in response to the idle percentage of the first drive dropping below an additional idle percentage threshold lower than the second idle percentage threshold; and
   cap, based on a drive type of the first drive, the length of an acknowledgment delay at a cap value, the cap value being different for different drive types.

5. The system of claim 4, wherein the processor is further to decrement a length of acknowledgment delay, for an I/O command directed at the first drive, in response to the cache availability rising above the additional cache availability threshold, or in response to the idle percentage of the first drive rising above the additional idle percentage threshold.

6. The system of claim 1, wherein the processor is to:
   store the acknowledgment for the first I/O command in an acknowledgment queue during the delay based on the length of the acknowledgment delay.

7. A non-transitory machine-readable storage medium encoded with instructions that upon execution cause a system to:
   determine whether a cache availability of a cache is greater than a cache availability threshold;
   in response to determining that the cache availability of the cache is greater than the cache availability threshold, set, for a first input/output (I/O) command directed at a first drive, a length of an acknowledgment delay at zero;
   in response to determining that the cache availability of the cache is not greater than the cache availability threshold:

determine an activity level of the first drive, and
set, for the first I/O command directed at the first drive, the length of the acknowledgment delay based on the determined activity level of the first drive; and
transmit an acknowledgment for the first I/O command after a delay based on the length of the acknowledgment delay.

8. The non-transitory machine-readable storage medium of claim 7, wherein the instructions are executable to store acknowledgments for I/O commands for which acknowledgment delays of non-zero length are determined in an acknowledgment queue.

9. The non-transitory machine-readable storage medium of claim 7, wherein the cache availability threshold is a first cache availability threshold, and wherein the instructions upon execution cause the system to further:
set the length of the acknowledgment delay, for the first I/O command, at a first non-zero value in response to the cache availability being below the first cache availability threshold, and an idle percentage of the first drive being below a first idle percentage threshold; and
set a length of an acknowledgment delay, for a second I/O command that is directed at a second drive, at zero in response to the cache availability being below the first cache availability threshold, and an idle percentage of the second drive being above the first idle percentage threshold.

10. The non-transitory machine-readable storage medium of claim 9, wherein the instructions upon execution cause the system to further:
increment a length of an acknowledgment delay, for an I/O command directed at the first drive, in response to the cache availability dropping below an additional cache availability threshold lower than the first cache availability threshold, or in response to the idle percentage of the first drive dropping below an additional idle percentage threshold lower than the first idle percentage threshold; and
cap, based on a drive type of the first drive, a length of an acknowledgment delay for an I/O command that is directed at the first drive.

11. The non-transitory machine-readable storage medium of claim 10, wherein the instructions upon execution cause the system to decrement a length of an acknowledgment delay, for an I/O command directed at the first drive, in response to the cache availability rising above the additional cache availability threshold, or in response to the idle percentage of the first drive rising above the additional idle percentage threshold.

12. A method executed by a system comprising a processor, the method comprising:
determining whether a cache availability of a cache is greater than a cache availability threshold;
in response to determining that the cache availability of the cache is greater than the cache availability threshold, setting, for a first input/output (I/O) command directed at a first drive, a length of an acknowledgment delay at a specified value;
in response to determining that the cache availability of the cache is not greater than the cache availability threshold:
determining an activity level of the first drive, and
setting, for the first (I/O) I/O command directed at the first drive, the length of the acknowledgment delay based on the determined activity level of the first drive; and
transmitting an acknowledgment for the first I/O command after a delay based on the length of the acknowledgment delay.

13. The method of claim 12, further comprising storing the acknowledgment in an acknowledgment queue during the delay.

14. The system of claim 1, wherein the processor is to:
store the first I/O command in the cache, wherein the determining of the cache availability of the cache and the setting of the length of the acknowledgment delay are performed after the storing of the first I/O command in the cache.

15. The system of claim 1, wherein the activity level of the first drive comprises an idle percentage of the first drive.

16. The system of claim 1, wherein in response to determining that the cache availability of the cache is not greater than the cache availability threshold, the processor is to:
set, for the first I/O command, the length of the acknowledgment delay at a first non-zero value in response to the determined activity level of the first drive being greater than a first threshold, and
set, for the first I/O command, the length of the acknowledgment delay at a different second non-zero value in response to the determined activity level of the first drive not being greater than the first threshold.

17. The system of claim 1, wherein the cache availability threshold is a first cache araciality threshold, and in response to determining that the cache availability of the cache is not greater than the first cache availability threshold, the processor is to:
set, for the first I/O command, the length of the acknowledgment delay at the first non-zero value further in response to the cache availability being less than a second cache araciality threshold.

18. The non-transitory machine-readable storage medium of claim 7, wherein the length of the acknowledgment delay for the first I/O command is set for the first I/O command already stored in the cache.

19. The non-transitory machine-readable storage medium of claim 7, wherein the instructions upon execution cause the system to further:
in response to determining that the cache availability of the cache is not greater than the cache availability threshold:
set, for the first I/O command, the length of the acknowledgment delay at a first non-zero value in response to the determined activity level of the first drive being greater than a first threshold, and
set, for the first I/O command, the length of the acknowledgment delay at a different second non-zero value in response to the determined activity level of the first drive not being greater than the first threshold.

20. The non-transitory machine-readable storage medium of claim 19, wherein the cache availability threshold is a first cache araciality threshold, and wherein the instructions upon execution cause the system to further:
in response to determining that the cache availability of the cache is not greater than the cache availability threshold:
set, for the first I/O command, the length of the acknowledgment delay at the first non-zero value further in response to the cache availability being less than a second cache araciality threshold.

21. The method of claim 12, further comprising:
for a second I/O command directed at the first drive, determining whether a cache availability of the cache is greater than the cache availability threshold; and
in response to determining that the cache availability of the cache determined for the second I/O command is greater than the cache availability threshold, setting, for the second I/O command directed at the first drive, a length of an acknowledgment delay at zero.

\* \* \* \* \*